(12) United States Patent
Pabari et al.

(10) Patent No.: US 8,317,027 B2
(45) Date of Patent: Nov. 27, 2012

(54) DISPENSING CONTAINER

(76) Inventors: Alpa Shantilal Pabari, Chelmsford (GB); Hiten Shantilal Pabari, Chelmsford (GB)

(*) Notice: Subject to any disclaimer, the term of this patent is extended or adjusted under 35 U.S.C. 154(b) by 208 days.

(21) Appl. No.: 12/594,654

(22) PCT Filed: Apr. 3, 2008

(86) PCT No.: PCT/GB2008/001177
§ 371 (c)(1),
(2), (4) Date: Jan. 21, 2010

(87) PCT Pub. No.: WO2008/122771
PCT Pub. Date: Oct. 16, 2008

(65) Prior Publication Data
US 2010/0147733 A1 Jun. 17, 2010

(30) Foreign Application Priority Data
Apr. 5, 2007 (GB) .................................. 0706789.5

(51) Int. Cl.
*B65D 83/04* (2006.01)
(52) U.S. Cl. .................. 206/532; 206/538; 206/561
(58) Field of Classification Search .............. 206/539, 206/538, 561, 532; 190/109
See application file for complete search history.

(56) References Cited

U.S. PATENT DOCUMENTS

| 4,038,937 A | 8/1977 | Moe | |
| 4,084,695 A * | 4/1978 | Halbich | 206/532 |
| 4,693,371 A * | 9/1987 | Malpass | 206/538 |
| 7,395,929 B2 * | 7/2008 | Keffeler et al. | 206/532 |
| 7,963,068 B2 * | 6/2011 | Cope et al. | 47/87 |
| 2005/0051454 A1 | 3/2005 | Coe et al. | |

FOREIGN PATENT DOCUMENTS

| GB | 2 408 256 A | 5/2005 |
| WO | 90/07921 A1 | 7/1990 |
| WO | 92/02202 A1 | 2/1992 |
| WO | 96/40838 A2 | 12/1996 |
| WO | 99/25307 A1 | 5/1999 |
| WO | 2006/013371 A1 | 2/2006 |

* cited by examiner

*Primary Examiner* — Andrew Perreault
(74) *Attorney, Agent, or Firm* — Young Basile

(57) ABSTRACT

A re-usable dispensing container (10) for pills, tablets or capsules, includes a base portion (20) having a plurality of compartments (25). An adhesive-free sealing sheet (50) is arranged to cover openings of the compartments such that the sheet may be ruptured to provide access individually to the compartments. A sealing sheet retainer (30), having apertures thorough which the sheet may be ruptured, is removably closable over the sealing sheet removably to retain the sealing sheet between the sealing sheet retainer and the base. A lid (40) is provided to cover the sealing sheet retainer (30) and is lockable to the base with a tamper-evident locking pin.

20 Claims, 5 Drawing Sheets

DISPENSING CONTAINER

This invention relates to a dispensing container and in particular to a compartmentalised dispensing container for medication comprising at least one of pills, tablets and capsules, and to an adhesive-free seal therefor.

Containers having a plurality of compartments to contain pills, tablets or capsules to be taken at predetermined intervals are known.

For example, a container is known from U.S. Pat. No. 4,038,937 which includes a removable tray in a drawer, the tray having a plurality of compartments to contain the pills, tablets and capsules. In an upper face there are a number of sliding shutters covering respective windows or apertures aligned with respective compartments, which shutters may be withdrawn selectively and progressively to discharge contents of individual compartments. Also on the upper face there are provided indicia representing, for example, days of the week and periods during each day.

This container may be used by, or for, individual patients within a community or in hospitals and other establishments where the dosage of medicines for patients may be made up, for example, once a week from a central dispensary.

One disadvantage of this known container is that it is necessary to separate the compartmentalised tray from the container in order to fill the compartments, and this can lead to trays being returned to incorrect containers with a consequent danger of administering incorrect medication to patients.

WO 90/07921 discloses a compartmentalised tray in a box having a hinged or removable lid with windows aligned with the compartments and shutters to open the windows to provide access to a compartment without opening the lid, with information displayed on the lid, so that all the compartments can be filled by opening the hinged or removable lid, without the tray separating from the information. The tray is, however, removable from the box for cleaning, replacement, and for gaining access to information-bearing media between the tray and the box.

WO 92/02202 discloses a box with a hinged or removable lid having windows, a compartmentalised tray removably located in a box beneath the lid, aligned with the windows and shutters so that a window may be opened to provide access to a compartment without opening the lid, but with the lid open or removed all the compartments can be filled, without the tray separating from information affixed to the dispenser. A thin acetate sheet or film may be sealed on the tray by an adhesive applied either to the top of the tray, or to the sheet, or to both, after the tray is filled.

GB 2408256 discloses a container having a body with recesses each with an open mouth surrounded by a portion of the body, the open mouth of each recess being closed by an imperforate cover secured to the surrounding portion by an adhesive bond, preferably a pressure-sensitive adhesive to form a permanent bond to prevent tampering, and a hinged lid to cover all the mouths. In one embodiment a single imperforate sheet extends over all the recesses. The imperforate sheet acts as a cover which assists in creating a sealed environment in each recess preventing the ingress of moisture and cross-contamination between recesses. However, the imperforate sheet requires a significant force to rupture so that the sheet cannot be ruptured by finger pressure alone, at least so as to make the pill dispenser child-proof. A stylus may therefore be provided to rupture the sheet. In some situations the requirement for a significant force to gain access to a compartment is disadvantageous, for example for self-administration of medication by weak, elderly or arthritic patients.

WO2006/013371 is directed to a seal for a pill dispenser with a plurality of recesses, each having an open mouth bounded by a surrounding portion of the body, the seal having a cover film having apertures cut in the cover sheet which are smaller than the mouths, the apertures in the cover film being closed by liner films larger than the cover film apertures so that the liners are located between the cover film and the recesses and each liner is removable by pushing the liner into a recess. The cover film is adhered to the body of the tray and the liner film is adhered to the cover film. However, this effectively requires use of a two-layer cover film and liner film combination.

A pill dispenser is also known which includes a compartmentalised tray in a box having a hinged lid with windows aligned with the compartments and shutters to open the windows to provide access to a compartment without opening the lid, with information displayed on the lid, so that all the compartments can be filled by opening the hinged or removable lid, without the tray separating from the information. The loaded tray is covered by a disposable sealing sheet attached to the top surface of the tray by adhesive, and the tray is removable from the box for cleaning adhesive from the tray before re-use, and for replacement of the tray or for gaining access to information-bearing media between a lower face of the tray and the box for display through a transparent window in the base of the box.

A similar pill dispenser does not have a tray but instead compartments are provided in the body of the box. Again, a disposable sealing sheet may be attached to the top surface of the tray by adhesive, but this suffers from a same disadvantage that old adhesive has to be removed before the dispenser can be re-used with a new adhesive sealing sheet.

In both these latter two dispensers, on the upper face there are provided indicia representing, for example, days of the week and periods during each day, at which medicines in the respective compartment are to be taken or administered.

The use of an adhesively sealed cover sheet in the prior art means that the medication cannot be changed, for example by a pharmacist, once the seal is in place, without replacing the cover sheet, or, where that is impractical for example because an adhesive bond is sufficiently strong to prevent removal for reuse of the dispenser, replacing the dispenser.

It is an object of the present invention at least to ameliorate the aforesaid disadvantages in the prior art.

According to a first aspect of the invention there is provided a re-usable dispensing container for pills, tablets or capsules, the dispensing container comprising a base portion having a plurality of compartments, adhesive-free sealing sheet means arranged to cover openings of the compartments such that the sealing sheet means is rupturable to provide access individually to the compartments and retaining means removably closable over the sealing sheet means to removably retain the sealing sheet means between the retaining means and the base portion.

Conveniently, the sealing sheet means is locatable on the base means.

Alternatively, the sealing sheet means is locatable on the retaining means.

Preferably, the dispensing container further comprises tamper-evident means arranged to lock the retaining means to the base portion.

Conveniently, the tamper-evident means comprises fixing means partially passable though the retaining means and the base means to removably fix the retaining means to the base means.

Advantageously, the sealing sheet means is an adhesive-free frangible sheet.

Conveniently, the frangible sheet is at least partially perforated or scored.

Preferably, the retaining means is hinged to the base means.

Advantageously, the retaining means comprises a framework with apertures aligned with the openings of the compartments in a closed position of the retaining means.

Conveniently, the dispensing container further comprises lid means for covering the retaining means.

Advantageously, the lid means is hinged to the base portion.

Conveniently, the dispensing container further comprises latching means for latching the retaining means closed on the base means.

Preferably, the sealing sheet means comprises an array of recesses for locating in outermost portions of respective compartments.

Conveniently, the frangible sheet is labelled with at least one of days and times at which the pills, tablets or capsules in a corresponding compartment are to be dispensed.

According to a second aspect of the invention, there is provided a method of dispensing medication comprising at least one of pills, tablets and capsules, comprising the steps of: loading with doses of the medication for administration at respective predetermined times respective compartments of a dispensing container comprising a base portion having a plurality of compartments; locating an adhesive-free sealing sheet to cover openings to the compartments; and removably affixing retaining means to retain the sealing sheet over openings of the compartments.

Preferably, the sealing sheet is provided with recesses and the step of locating the sealing sheet comprises locating the recesses in outermost portions of respective compartments.

Alternatively, the step of locating the sealing sheet comprises locating the sealing sheet on the retaining means.

Advantageously, the method further comprises removably fixing the retaining means to the base portion with tamper-evident locking means.

A method as clamed in any of claims 12 to 14, further comprising using finger pressure to break a frangible portion from a corresponding recess opening sufficiently to remove the medication contained within the compartment for administration at the predetermined time.

Advantageously, the method comprises a further step of removing the tamper-evident locking means, opening the retaining means and removing the sealing sheet partially used to change medication in unused compartments, replacing the partially used sealing sheet and re-locking the dispenser.

Advantageously, the method comprises a further step of removing the tamper-evident locking means, opening the retaining means and removing the used sealing sheet to re-stock the compartments with medication, locating an unused sealing sheet between the retaining means and the base means to cover the compartments and re-locking the dispenser.

The invention will now be described, by way of example, with reference to the accompanying drawings in which.

In the Figures, like reference numbers denote like parts.

Figure 1:
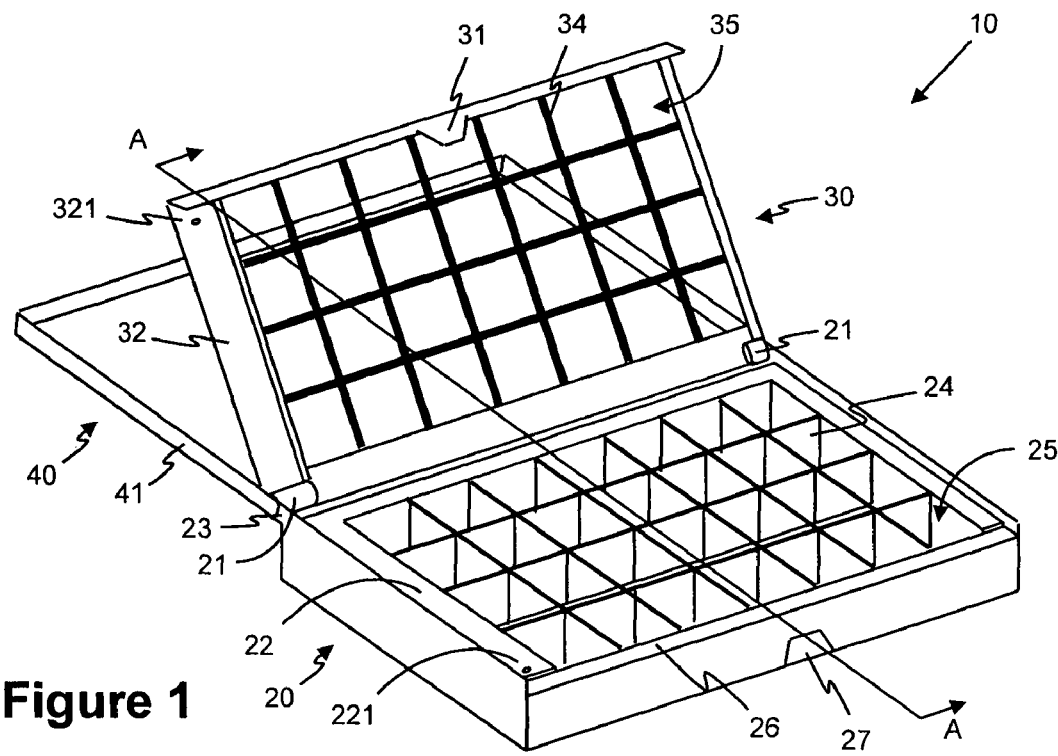
FIG. 1 is a schematic perspective view of a dispensing container according to the invention, with a lid and seal retainer thereof open.

Referring to FIG. 1, a dispensing container 10 according to the invention comprises a base portion 20, a seal retaining portion 30 hinged to the base by a hinge 21 at a major rear edge of the base portion 20 and a lid portion 40 hinged by the same hinge 21 to the base portion.

The base portion 20 comprises a box portion divided by compartment walls 24 into a regular array of twenty-eight substantially identical, substantially cuboid compartments 25, arranged in four rows of seven compartments, such that the compartments 25 are contained between opposed peripheral walls of the base portion 20.

As viewed in FIG. 1a left-hand side of the box portion is provided with a platform portion 22 coplanar with upper faces of the compartment walls and wider than margins on the three other sides of the box portion. An aperture 221 for receiving a locking device 70 to be described herein is provided in the platform portion proximate a front of the box portion.

Opposed side walls rise up above the plane defined by the upper faces of the compartment walls, the platform portion 22 and other margins and extend as opposed hinge projections 23 beyond a back wall of the base portion to accommodate the hinges 21. An outer face of the front wall of the base portion is provided with a central, substantially isosceles trapezium-shaped depression 27 for latching a catch 31 on the seal retaining portion 30 in a manner to be described herein.

Figure 3:
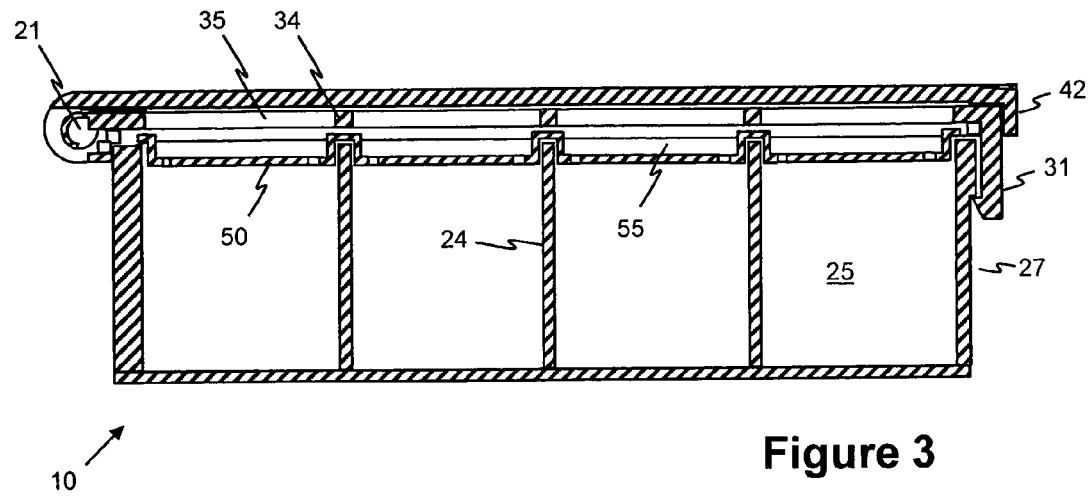
FIG. 3 is a vertical cross-section along the line A-A of FIG. 1, but with the lid closed and on an enlarged scale compared with FIG. 1.
Figure 4:
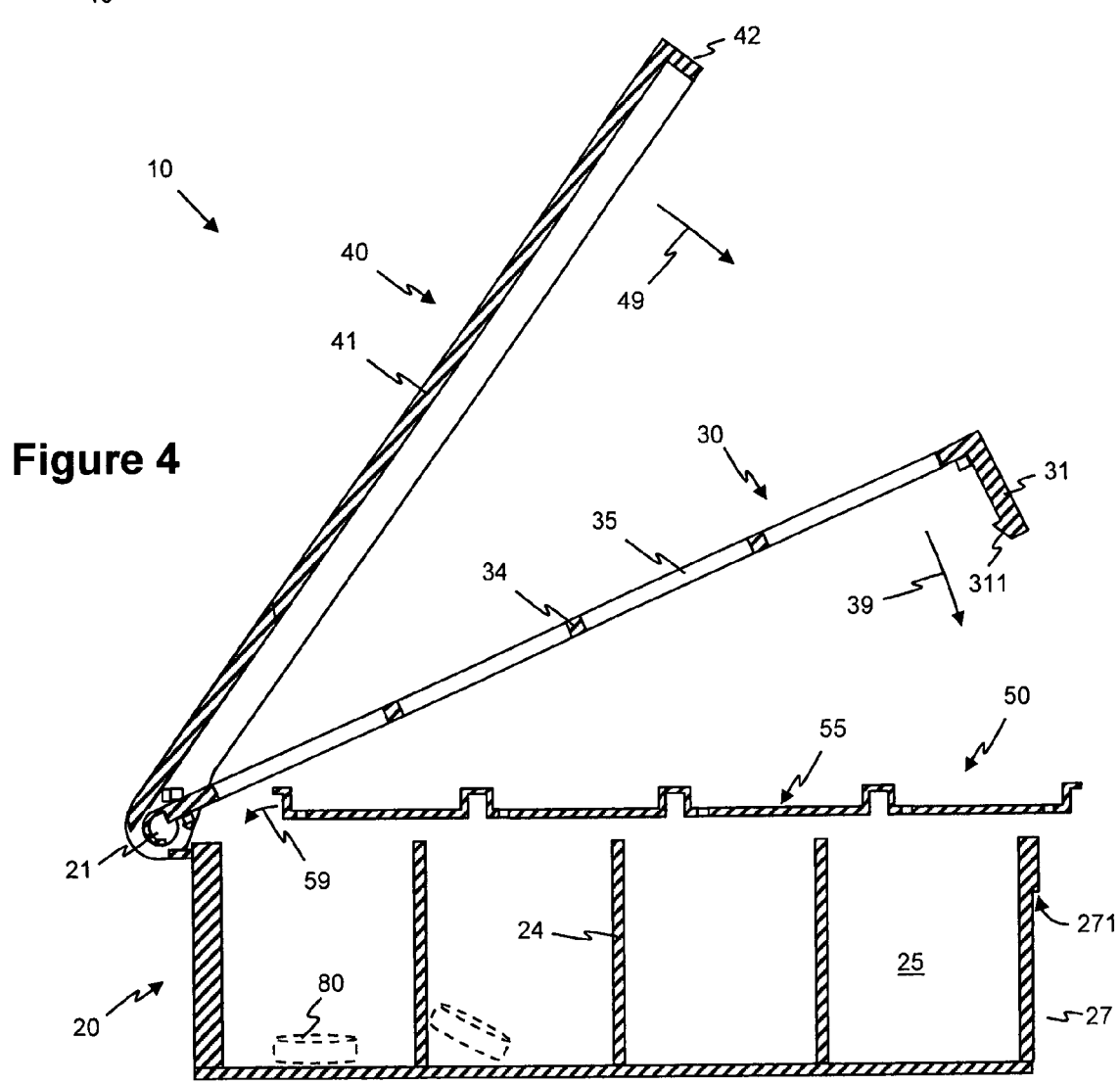
FIG. 4 is a vertical cross-section as in FIG. 3, but with the lid and seal retainer partially open.

The seal retaining portion is hingedly fixed to opposed inner faces of the opposed hinge projections 23 of the side walls. The seal retaining portion 30 comprises a fretwork of intersecting members 34 defining an array of apertures 35 each corresponding to a respective compartment 25 of the base portion 20, such that respective apertures 35 are aligned with respective compartments 25 when the seal retaining portion 30 is hinged closed on the base portion 20. The seal retaining portion is therefore provided with a wider margin 32 on a left hand side, as viewed in FIG. 1, than on the three other sides of the fretwork, corresponding, in a closed position of the seal retaining portion, with the platform portion 22 in the base portion. A second aperture 321 is provided in this wider margin 32 positioned so as to coincide with the first aperture 221 in the platform portion in a closed position of the seal retaining portion. As best seen in FIGS. 3 and 4, a front edge of the seal retaining portion is provided with a resilient catch 31 comprising a latching projection 311 on an inner face thereof for latching an upper edge 271 of the recess 27 in the front wall of the base portion when the seal retaining portion is closed.

The lid portion 40 is hinged to outer faces of the hinge projections 23 and comprises a planar portion 41 with walls 42 on three sides other than the hinged edge, dependent from the planar portion 41 in a closed position of the lid and dimensioned to provide a friction fit over the seal-retaining portion 30 in a closed position.

Figure 2:
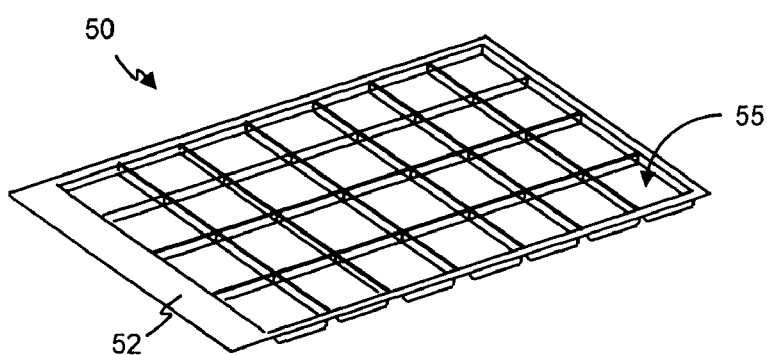
FIG. 2 is a schematic perspective view of an adhesive-free sealing sheet of the dispensing container of claim 1.

As best seen in FIG. 2, there is further provided a disposable, perforated, adhesive-free, sealing sheet 50 comprising an array of shallow recesses 55 otherwise corresponding to the array of compartments 25 in the base portion 20, the sealing sheet and recesses being dimensioned to be located over upper portions of the compartment walls 24 with the recesses 55 occupying upper portions of the compartments 25, so that the sealing sheet is self-aligning. The sealing portion is provided with a wider sealing portion margin 52, on a left hand side as seen in FIG. 2, corresponding to the platform portion 22 in the base portion and the wider sealing retention margin 32 in the seal retaining portion. The recesses 55 of the sealing sheet 50 preferably taper outwards from a base of the recesses to an opening thereof, to permit stacking of a plurality of the sealing sheets with recesses of one sheet at least partially occupying recesses of a next sheet in a stack.

Figure 5:
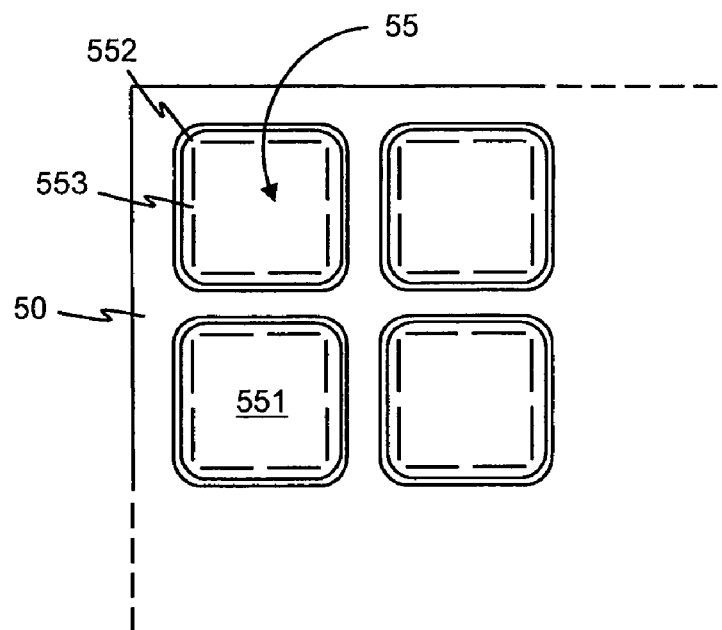
FIG. 5 is a schematic plan view of a portion of a first embodiment of an adhesive-free sealing sheet according to an aspect of the invention.
Figure 6:
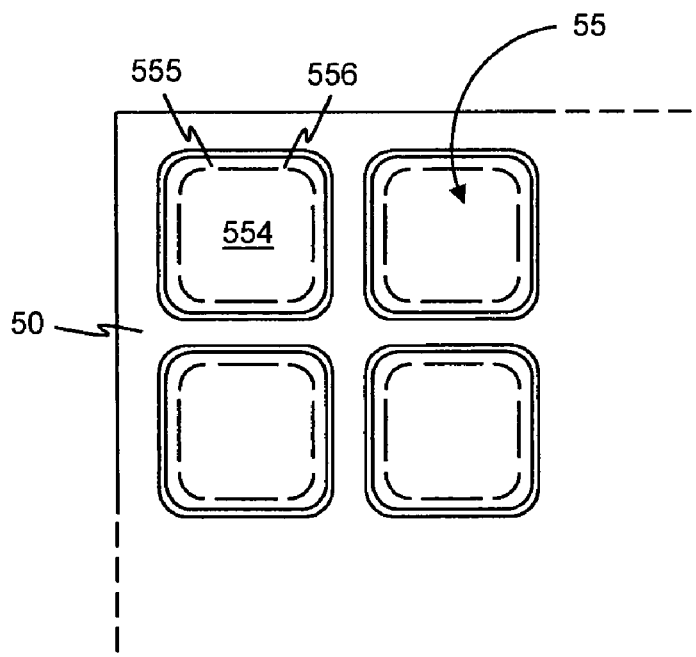
FIG. 6 is a schematic plan view of a portion of a second embodiment of an adhesive-free sealing sheet according to an aspect of the invention.

As best shown in FIGS. 5 and 6, bases 551, 554 of the recesses 55 are perforated or otherwise have frangible portions for removal of the base portion or at least partial detachment of the base portion in use to dispense medication, in a manner to be described herein. In a first embodiment shown in FIG. 5, edges of a base portion 551 of a recess are perforated to leave the base attached by first frangible portions 552 in apexes of the base and by second frangible portions 553 substantially central of each side of the base 551. In a second embodiment shown in FIG. 6 edges of a base portion 554 of a recess 55 are perforated to leave the base attached by first frangible portions 555 and second frangible portions 556 spaced along each side of the base 554. It will be understood that these are only examples of possible perforation patterns and the recesses may be perforated in other ways which allow access to the compartments on breaking the sealing sheet along the perforations.

More generally, junctions between the frangible base portion 551, 554 and a remainder of the sealing sheet 50 may be either perforated or scored sufficiently for the frangible portion to be removed by finger pressure alone by a patient or nursing or care staff.

Figure 7:
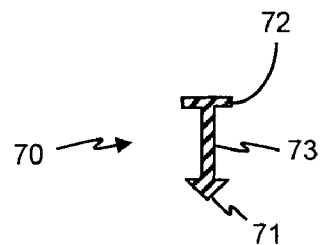
FIG. 7 is an axial cross-sectional view of a tamper-evident locking device according to the invention.
Figure 8:
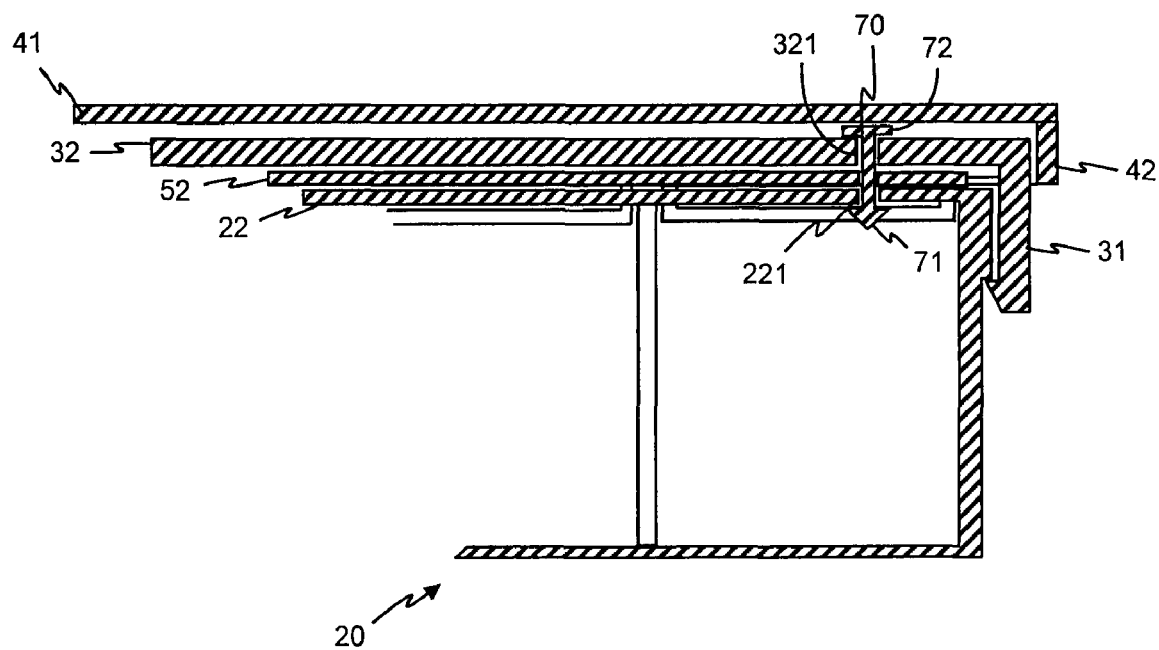
FIG. 8 is a vertical cross-sectional view of a portion of a dispenser according to the invention, showing the locking device of FIG. 7 in use.

Referring to FIGS. 7 and 8 there is further provided a tamper-evident locking device 70 having an arrowhead portion 71 at a first end and retaining bar or disc portion 72 at an opposed end joined by a shaft portion 73. The device 70 is dimensioned such that the arrowhead portion 71 may resiliently pass through the first and second apertures 221, 321 in the base portion platform portion 22 and seal retaining portion wider margin 32 respectively but passage through the apertures is prevented by the retaining portion 72.

As illustrated, the dispensing container 10, and in particular the lid portion and sealing sheet, may be of transparent plastics material so that contents of the compartments are visible through the lid. However, it will be understood that parts, or all, of the dispenser may be of, for example, translucent or opaque plastics material.

It will be understood that an array of 28 recesses as illustrated is convenient for containing, for example, four daily medications for one week or single daily medications for four weeks. However, different numbers of recesses may be provided in further embodiments of the invention for different numbers or intervals of medication.

Although a dispenser with substantially identical compartments has been described, it will be understood that differently-sized compartments may be provided in another embodiment of the invention, for example, where a larger volume of medication is required at one time of day than at another time of day.

The sealing sheet 50 may be printed or otherwise provided with information indicating, for example, days of the week corresponding to columns of the array and times of day corresponding to rows of the array, for example on the base portion of the recesses.

Figure 9:
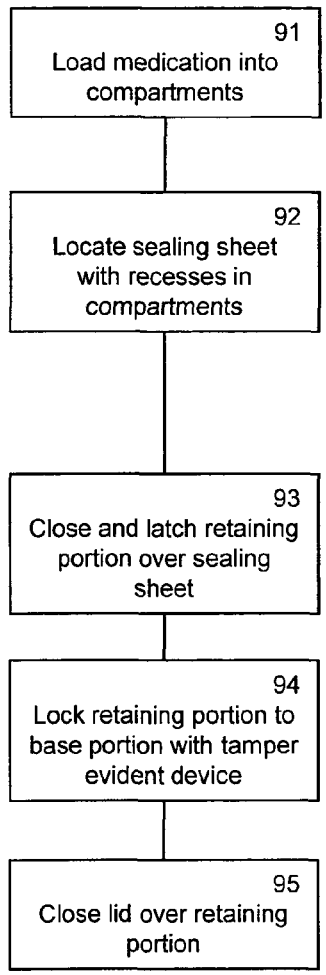
FIG. 9 is a flowchart of a method of loading medication into the dispenser according to the invention.

Referring especially to FIGS. 4 and 9, in use, with the lid and seal retaining portions 30, 40 open, the dispensing container 10 is loaded 91 by locating at least one of appropriate pills, tablets and capsules 80 in appropriate compartments 25. A sealing sheet 50 is located 92 in direction of arrow 59 so that the sealing sheet is self-aligned with portions of the sealing sheet between recesses located over uppermost portions of the compartment walls 24, the recesses 55 in uppermost portions of the compartments and the wider margin 52 of the sealing portion 50 overlying the platform portion 22 of the base portion 20. The seal retaining portion 30 is hingedly closed 93 in a direction of arrow headed line 39 so that the catch 31 resiliently passes over an outer face of the front wall of the base portion above the trapezium-shaped recess 27 until the latching projection 311 engages an upper edge 271 of the trapezium-shaped recess 27. As best seen in FIG. 3, the sealing sheet 50 is thus sandwiched between the fretwork 34 of the seal retaining portion 30 and upper faces of the compartment walls 24 as well as margins of the sealing sheet being sandwiched between margins of the seal retaining portion 30 and margins of the base portion 20.

As best shown in FIG. 8, the arrowhead portion 71 of the locking and tamper evident device 70 is passed resiliently thorough the second aperture 321 in the wider margin 32 of the seal retaining portion 30, pieces the wider margin 52 of the sealing sheet 50 and passes resiliently through the first aperture 221 in the platform portion 22 of the base portion 20 whereupon the arrowhead portion 71 resiliently regains its at rest shape and engages a lower face of the platform portion 22 and the retaining portion 72 prevents further passage of the device 70 through the apertures 321, 221. Thus the seal retaining portion 30 is locked 94 to the base portion 20 in a tamper-evident manner.

Thus the sealing sheet is securely retained to close the compartments without use of an adhesive or other form of hot or cold sealing of the sheet to the base portion.

Referring again to FIG. 4, the hinged lid 40 is preferably hingedly closed 95 in direction of arrow 49 over the seal retaining portion 30 to prevent inadvertent rupture of the frangible bases 551, 554 of the sealing sheet 50.

Figure 10:
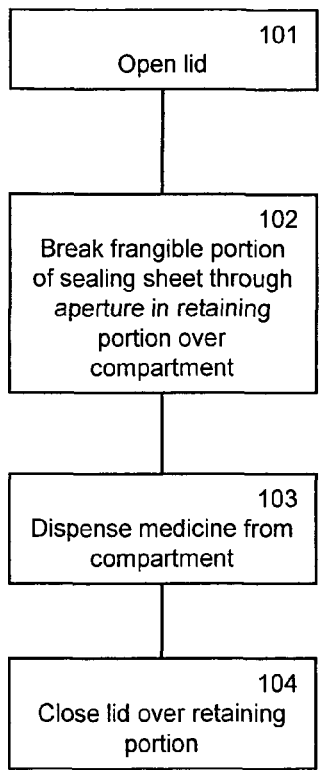
FIG. 10 is a flowchart of a method of dispensing medication from the dispenser according to the invention.

Referring to FIG. 10, in order to dispense medication the hinged lid 40 is opened 101 and a frangible portion 551, 554 of a compartment 25 appropriate for the day and time is at least partially torn, or otherwise at least partially removed 102, from a remainder of the sealing sheet 50 for example by finger pressure on the frangible portion 551, 554. Preferably, the frangible portion is grasped between a thumb and forefinger and completely removed. The medication in the said compartment 25 is removed 103 for administration or self-administration. The hinged lid 40 is preferably re-closed 104.

Figure 11:
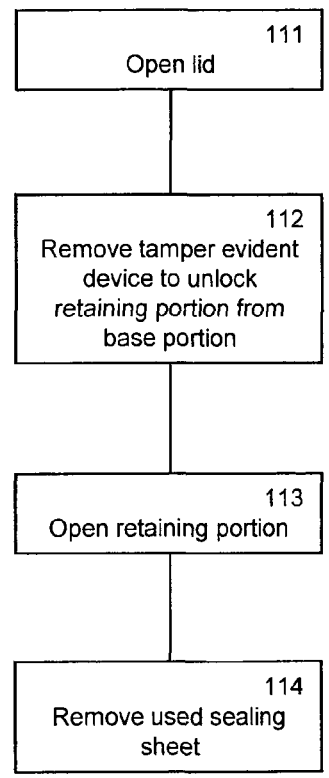
FIG. 11 is a flowchart of a method of preparing the dispenser for re-use according to the invention.

Referring to FIG. 11, in order to re-use the dispenser 10, for example, after all the medication has been dispensed, the lid 40 is opened 111 and the seal retaining portion 30 hingedly opened 113 by breaking or otherwise removing 112 the tamper-evident locking device 70. In one embodiment of the invention a lower, arrowhead portion 71 of the locking device is retained in a chamber, not shown, in the base portion 20 beneath the platform portion 22. The used sealing sheet 50 is removed 114 and the dispenser 10 re-loaded 91 as described above.

Alternatively, if it is required to change a patient or other user's medication after the dispenser has been sealed and locked, for example mid-week, the tamper-evident locking device maybe be readily snipped or otherwise removed and the dispenser opened to effect the change of medication. The dispenser can be relocked with a new tamper-evident locking device at only the insignificant cost of a tamper-evident locking device.

Although a dispensing container which is substantially rectangular in plan view has been described, it will be understood that dispensing containers according to the invention could have shapes other than rectangular in plan view, for example a substantially elliptical shape. It will be understood that in other embodiments either or both of the lid and the seal retaining portion can be attached to the base portion other than by being hingedly affixed to the base portion, for example a clip-on retaining portion and/or lid can be envisaged. It will be understood that in some embodiments the lid could be dispensed with altogether.

Although an embodiment of the invention has been described in which a recessed sealing sheet is located on the compartment walls, it will be understood that a recessed sealing sheet could alternatively be located in a lower face of the fretwork of the seal retaining portion 30.

The invention provides an advantage of avoiding the complexity of manufacturing and operating slidable shutters necessary in some of the prior art, and of avoiding a concomitant danger, especially if the container is inverted, of inadvertently opening the shutter too wide and dispensing medication from more than one recess. Moreover, the present invention probably provides superior sealing, at least in an embodiment using partially scored frangible portions, to a container having slideable shutters covering windows.

The invention provides an advantage over dispensing containers with removable trays in that there is no removable tray in the dispensing container of the invention which can be inadvertently returned to an incorrect dispensing container belonging to a patient other than a patient for whom the medication in the tray was intended.

The single layer sealing sheet of the present invention avoids the manufacturing and operational complexities of a separate cover film and liner film required in some of the prior art.

The sealing sheet of the present invention is frangible by finger pressure making self-dispensing possible by weak or elderly patients without the necessity of use of a stylus or other tool, as required in some of the prior art, which stylus or tool might easily be mislaid.

The avoidance of an adhesive sealing sheet avoids a necessity of cleaning old adhesive from a dispenser before the dispenser can be re-used. However, tampering with the contents is at least discouraged by use of a tamper-evident locking device.

Moreover, the use of an adhesive-free sealing sheet allows re-use of a dispenser with a new sealing sheet once all the recesses in the sealing sheet have been broken open, or the re-use of a partially used sealing sheet when medication in the dispenser is changed after initial filling.

The invention claimed is:

1. A re-usable dispensing container for pills, tablets or capsules, the dispensing container comprising a base portion having compartments arranged in a two-dimensional array, adhesive-free sealing sheet means arranged to cover openings of the compartments such that the sealing sheet means is rupturable to provide access individually to the compartments and retaining means hinged to the base portion, the retaining means comprising a framework with apertures aligned with the openings of the compartments in the closed position of the retaining means, the retaining means being repeatedly removably closable over the sealing sheet means removably to retain the sealing sheet means between the retaining means and the base portion, wherein the sealing sheet means comprises tapering recesses arranged in a two-dimensional array for locating the tapering recesses in outermost portions of respective compartments, each tapering recess tapering from a base of the tapering recess to an opening thereof, and further comprising separate lid means for covering the retaining means.

2. A dispensing container as claimed in claim 1, wherein the sealing sheet means is locatable on the base portion.

3. A dispensing container as claimed in claim 1, wherein the sealing sheet means is locatable on the retaining means.

4. A dispensing container as claimed in claim 1, further comprising tamper-evident means arranged to lock the retaining means to the base portion.

5. A dispensing container as claimed in claim 4, wherein the tamper-evident means comprises fixing means partially passable though the retaining means and the base portion to removably fix the retaining means to the base portion.

6. A dispensing container as claimed in claim 1, wherein the sealing sheet means is an adhesive-free frangible sheet.

7. A dispensing container as claimed in claim 6, wherein the frangible sheet is at least partially perforated or scored.

8. A dispensing container as claimed in claim 1, wherein the lid means is hinged to the base portion.

9. A dispensing container as claimed in claim 1, comprising latching means for latching the lid means closed on the base portion.

10. A dispensing container as claimed in claim 1, wherein the frangible sheet is labelled with at least one of days and times at which the pills, tablets or capsules in a corresponding compartment are to be dispensed.

11. A method of preparing medication for dispensing using the dispensing container as claimed in claim 1, the medication comprising at least one of pills, tablets and capsules, the method comprising the steps of:
   a. loading with doses of the medication for administration at respective predetermined times respective compartments of the dispensing container, the dispensing container comprising the base portion having the two-dimensional array of compartments, the adhesive-free sealing sheet means arranged to cover the openings of the compartments such that the sealing sheet means is rupturable to provide access individually to the compartments and the retaining means comprising the framework with apertures aligned with the openings of the compartments in the closed position of the retaining means, the retaining means being repeatedly removably closable over the sealing sheet means removably to retain the sealing sheet means between the retaining means and the base portion;
   b. locating the adhesive-free sealing sheet means to cover the openings of the compartments, wherein the sealing sheet means comprises the two-dimensional array of tapering recesses which are located in the outermost portions of respective compartments;
   c. removably affixing the retaining means so as to be hinged to the base portion removably to retain the sealing sheet means over the openings of the compartments; and d. covering the retaining means with the separate lid means.

12. A method as claimed in claim 11, wherein the step of locating the sealing sheet means comprises locating the sealing sheet means on the retaining means.

13. A method as claimed in claim 11, further comprising removably fixing the retaining means to the base portion with tamper-evident locking means.

14. A method as claimed in claim 11, further comprising using finger pressure to break a frangible portion from a corresponding recess opening sufficiently to remove the medication contained within the compartment for administration at the predetermined time.

15. A method as claimed in claim 11, comprising a further step of removing the tamper-evident locking means, opening the retaining means and removing the sealing sheet means partially used to change medication in unused compartments, replacing the partially used sealing sheet means and re-locking the dispensing container.

16. A method as claimed in claim 13, comprising a further step of removing the tamper-evident locking means, opening the retaining means and removing the used sealing sheet means to re-stock the compartments with medication, locating an unused sealing sheet between the retaining means and the base portion to cover the compartments and re-locking the dispensing container.

17. A dispensing container as claimed in claim 1 wherein walls of the compartments are at right angles with respect to each other; and
   wherein the tapering recesses are adjacent walls of the compartments.

18. A dispensing container as claimed in claim 1 wherein said retaining means is hinged to the base portion by a hinge projecting from only one edge of the base portion.

19. A dispensing container as claimed in claim 18 wherein said lid means is hinged to the base portion by said hinge.

20. A dispensing container as claimed in claim 1 wherein the framework of said retaining means comprises a fretwork of intersecting members forming each of the apertures.

* * * * *